United States Patent
Baker

(10) Patent No.: US 10,646,777 B2
(45) Date of Patent: May 12, 2020

(54) GAMING SYSTEM OVER WIFI LINK

(71) Applicant: Brad Baker, Dallas, TX (US)

(72) Inventor: Brad Baker, Dallas, TX (US)

( * ) Notice: Subject to any disclaimer, the term of this patent is extended or adjusted under 35 U.S.C. 154(b) by 912 days.

(21) Appl. No.: 15/077,415

(22) Filed: Mar. 22, 2016

(65) Prior Publication Data
US 2016/0199732 A1    Jul. 14, 2016

Related U.S. Application Data

(63) Continuation-in-part of application No. 13/907,403, filed on May 31, 2013, now Pat. No. 9,569,933.

(60) Provisional application No. 62/182,324, filed on Jun. 19, 2015.

(51) Int. Cl.
| | |
|---|---|
| *A63F 13/79* | (2014.01) |
| *G07F 17/32* | (2006.01) |
| *A63F 13/35* | (2014.01) |
| *A63F 13/77* | (2014.01) |

(52) U.S. Cl.
CPC .............. *A63F 13/35* (2014.09); *A63F 13/79* (2014.09); *G07F 17/3218* (2013.01); *G07F 17/3223* (2013.01); *G07F 17/3241* (2013.01); *G07F 17/3276* (2013.01); *G07F 17/3293* (2013.01); *A63F 13/77* (2014.09)

(58) Field of Classification Search
None
See application file for complete search history.

(56) References Cited

U.S. PATENT DOCUMENTS

| | | | | |
|---|---|---|---|---|
| 2003/0109306 A1* | 6/2003 | Karmarkar | ............... | G07F 17/32 463/40 |
| 2008/0293494 A1* | 11/2008 | Adiraju | ................... | G07F 17/32 463/42 |
| 2009/0089565 A1* | 4/2009 | Buchanan | ............... | G06F 15/16 713/1 |

\* cited by examiner

*Primary Examiner* — Damon J Pierce
(74) *Attorney, Agent, or Firm* — Brad A. Baker

(57) ABSTRACT

Systems and methods for conducting a localized, electronic card game tournament adaptable for play in private homes and public venues with no equipment or system modifications are disclosed. In one embodiment the tournament players' identities are verified. Once the players' identities are identified, they are provided with handheld electronic game units and tournament entry credentials. Players will enter their tournament entry credentials into the respective handheld electronic game units. Once the tournament entry credentials have been entered into the handheld electronic game unit, game events are transmitted to the handheld electronic game unit from a single remote server. Furthermore, in this embodiment, the tournament entry fee, if any, is maintained separately from the remote game server and the handheld electronic game units. The fees may be collected and/or winnings may be paid in case, through electronic transfer or through electronic currency.

8 Claims, 9 Drawing Sheets

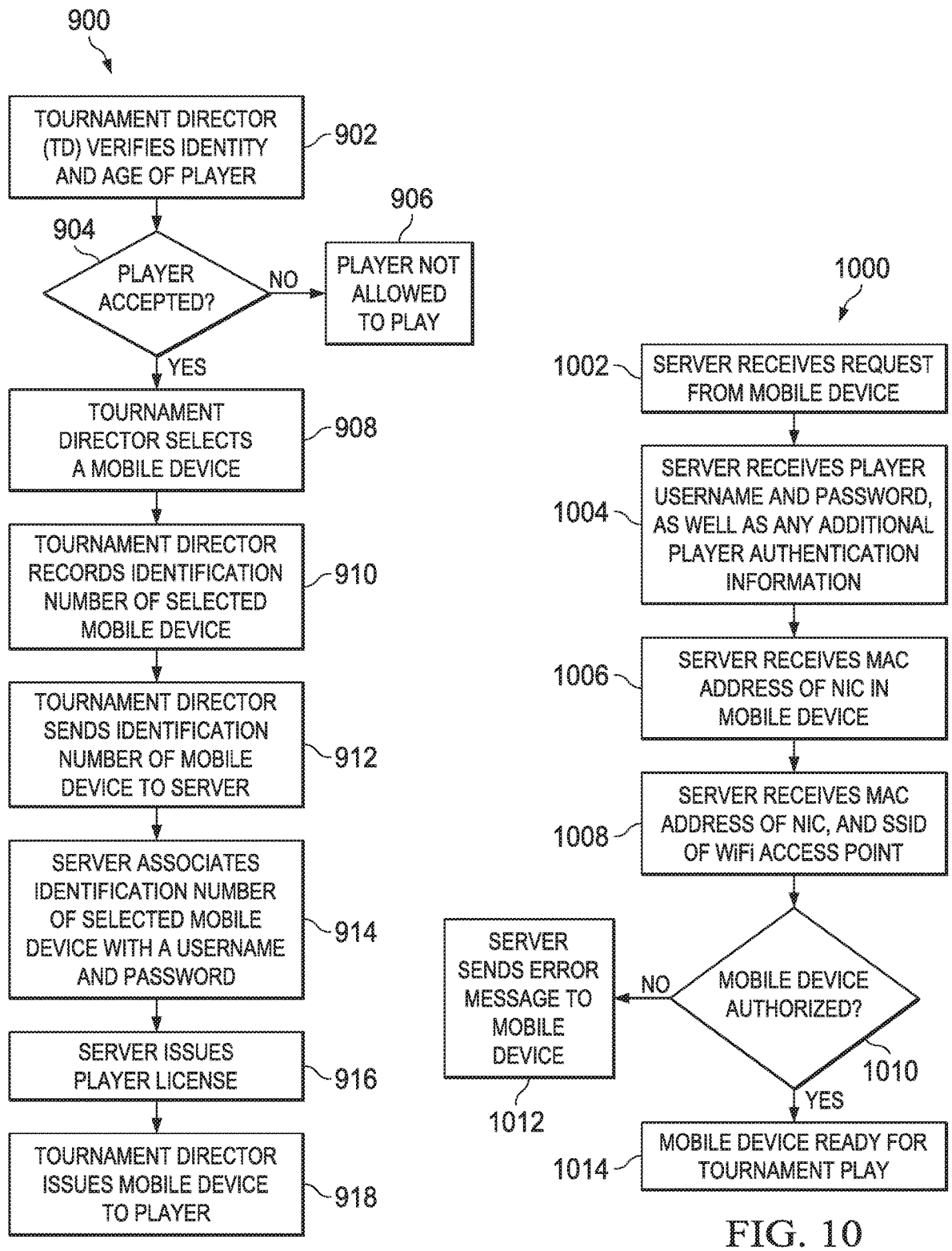

GAMING SYSTEM OVER WIFI LINK

CROSS-REFERENCE TO RELATED APPLICATIONS

This application is a continuation-in-part of U.S. patent application Ser. No. 13/907,403, filed May 31, 2013, and entitled METHOD AND APPARATUS FOR CONDUCTING AN ELECTRONIC CARD GAME TOURNAMENT, published as U.S. Patent Application Publication No. US 2014/0357335, which is incorporated herein by reference in its entirety. This application also claims the benefit of U.S. Provisional Patent Application No. 62/182,324, filed Jun. 19, 2015, and entitled GAMING SYSTEM OVER WIFI LINK, which is incorporated herein by reference in its entirety.

TECHNICAL FIELD

The present invention relates generally to conducting a localized, electronic card game tournament adaptable for play in private homes and public venues with no or limited equipment or system modifications.

BACKGROUND

Gaming is an extremely popular form of entertainment. Games, particularly, games of chance and skill in which one or more players play and place wagers on the outcome thereof may be played in a variety of ways, including at a casino or other venue or on the Internet. Of the various forms of games which are available for play, many are played with playing cards. Of these, poker is arguably the most popular.

Traditionally, poker is played at a table with several player wagering paper, coin money or chips on a series of playing cards dealt from a deck of fifty-two cards. This deck is comprised of four suits at thirteen cards per suit. This form of poker requires a human dealer to coordinate the game, including dealing, wagering, folding, etc. One of the problems with traditional poker is that it suffers from the possibility of human/dealer error. In "social" card games, especially poker, the players take turns acting as the dealer, but in licensed commercial gaming establishments, such as casinos, the dealer is typically a non-playing employee. Thus, another problem associated with traditional poker games in this context is the training and retention of dealers. Additionally, another problem associated with traditional poker is that all players must physically sit at the same playing table, often for hours on end.

One alternative form of gaming, with particular reference to poker, flourished on the Internet. Internet gaming became quite successful in that it provided many choices for the players. In particular, Internet gaming was successful because it is fast and convenient, with registration, betting and payouts available from almost any computer with Internet access and with payments typically arranged via a pay service, such as PayPal.

One hallmark characteristic of internet poker is that players at disparate locations are assigned to virtual tables to play against each other. The game is administered by a remote server at yet another disparate location. As such, internet poker games flourished with players across the globe able to play against each other at virtually any time.

Video poker in casinos and other establishments has also become popular. In these games, players play against each other from specific locations where local game servers in conjunction with remote servers administer the electronic games. Video poker or other card games may also be provided by stand-alone machines similar to slot machines. These games typically occur at fixed locations and require installation of at least one local game server at the fixed location.

One major drawback of Internet and stand-alone type games is the lack of the human element. Many people prefer to play poker against other players, due in part to the drama associated with "live" gaming.

Another major drawback is the difficulty in ensuring that playing games over the Internet complies with federal and state laws. By their nature, Internet games proliferate such that it is nearly impossible to ensure that players are located in specific locations or meet other criteria necessary to ensure legality of the games.

For example, the Unlawful Internet Gambling Act of 2006 (the "UIGA") was passed as a part of the Safe Accountability for Every Port Act of 2006 (the "SAFE Port Act"). The bill prohibits anyone engaged in the business of betting or wagering from accepting, in connection with unlawful Internet gambling, credit, an electronic fund transfer, a check or other payment drawn from a bank or any other financial transaction that involves a financial institution as the payor or intermediary. The statute defines unlawful Internet gambling as "to place, receive, or otherwise knowingly transmit a bet or wager by any means which involves the use, at least in part, of the Internet where such bet or wager is unlawful under any applicable Federal or State law." The effect of the UIGA has been to cause some organizations involved in i-gaming to stop accepting of bets originating in the United States.

In addition, eight states specifically regulate or prohibit i-gaming. Unlike China, the United States does not block or track Internet access. Without such restrictions on Internet access, it is all but impossible to regulate i-gaming by actually blocking an American from visiting certain websites. Thus, most state laws fit into the following four categories: laws against making bets, laws against taking bets, laws against financing of i-gambling wagers, and laws against advertising and promoting Internet gambling. The most common kinds of state regulation are laws against taking bets, and, to a lesser extent, laws against making bets primarily for technological reasons. Laws dealing with payment systems are almost exclusively federal because of the more complex nature of banking regulation and interstate commerce.

An additional drawback of video poker is that it requires rather extensive equipment set up. Typically, local game servers need to be installed in the venue where the games occur. Also video poker oftentimes requires electronic tables and/or other heavy equipment to be installed.

SUMMARY

This invention relates to conducting a localized, electronic card game tournament adaptable for play in private homes and public venues with no equipment or system modifications. An object of the invention is to maintain many of the benefits of electronic card game tournaments, such as lower costs related to dealers, while avoiding many of the drawbacks related to electronic card game tournaments, such as difficulties in ensuring compliance with federal and state laws and high equipment costs.

In one embodiment, the invention incorporates conducting an electronic Texas Hold'Em poker tournament in a personal residence or other localized venue. The tournament is a series of games during which players are eliminated at each successive tournament level until a winner(s) is declared. As an initial step in this embodiment the tournament players register for the tournament and their identities are verified. This verification may be made through reviewing a players' governmentally issued identification card or by any other reliable means of verification. Registration may occur prior to identity verification or at the same time as identity verification. In this embodiment, it is also contemplated that players may be required to pay a tournament entry fee. It is further contemplated that an equipment rental fee may be collected. Furthermore, the fees may be collected or winnings may be paid through cash, electronic transfer, or electronic currency.

Once the players' identities are identified, they are provided with handheld electronic game units and tournament entry credentials. The handheld electronic game units are of limited functionality in that they may only be used for player authentication and game play.

In this embodiment, it is also contemplated that players will enter their tournament entry credentials into the respective handheld electronic game units. Once the tournament entry credentials have been entered into the handheld electronic game unit, the game begins at a specified time, and game events are transmitted to the handheld electronic game unit from a single remote server. In this way, in the electronic card game tournament of the invention, the need for a local game server to be installed at the residence or localized venue where the tournament occurs is eliminated.

Furthermore, in this embodiment, the tournament entry fee is maintained separately from the remote game server and the handheld electronic game units and any fees associated with the use of the remote game server and the handheld electronic game units. The tournament winnings, which may be distributed from the tournament entry fees, are distributed directly to the appropriate players. The entry fee and winnings may be collected and/or distributed electronically.

With respect to player authentication, various methods have been used to verify submitted passwords in a network setting. In one embodiment, cryptographic protection is used for player authentication. The most widely used cryptographic protection is the Transport Layer Security (TLS, previously called SSL) feature built into most current Internet browsers. Most browsers alert the user of a TLS/SSL protected exchange with a server by displaying a closed lock icon, or some other sign, when TLS is in use.

It is obvious that there are several differences in electronic poker and live poker played in a casino. Most of these differences are easily seen and transparent to the general poker playing public. However, many contrasts are not visible or apparent while playing electronic poker. The major variance between electronic poker and live poker is the cards and how they are delivered to the player.

In the Texas Hold'Em variant of electronic poker, each player is dealt, face-down, a hand consisting of two cards. After a betting round, the electronic "dealer" turns face-up three communal cards known as the "flop". After another betting round, the dealer turns face up one more communal card. Another betting round follows, after which the dealer turns base of the last of the five communal cards. After a final betting round, the winning players are determined by comparing the best five card hand each player can make using their own personal two card hand in conjunction with any three of the five communal cards, using poker rank as the criterion for comparison.

The mechanics of electronic Texas Hold'Em poker are well known to those of skill in the art. They are discussed at length in numerous references, including for example Braids, Sam; *The Intelligent Guide to Texas Hold'Em Poker*; Intelligent Games Publishing; 2003, Towson, Md. As described therein, there are an abundance of software programs exhibiting the basic features of putting on poker games as required by the preferred embodiment of the invention. The discussion of poker software included in Braids is incorporated by reference as if set forth herein.

Furthermore, electronic poker requires the use of a random number generator ("RNG") to create a shuffled deck. The best way to go about creating a shuffling algorithm is to develop a technique that can securely produce a well-shuffled deck of cards by relying on sound mathematics. It is important that the shuffling algorithm maintains an even distribution of cards. A good distribution ensures that each position in the shuffle has an approximately equal chance of holding anyone particular card. The distribution requirement is relatively easy to achieve and verify. The following pseudo-code gives a simple card-shuffling algorithm that, when paired with the right random number generator, produces decks of cards with an even distribution.

```
START WITH FRESH DECK
GET RANDOM SEED
FOR CT = 1, WHILE CT <= 52, DO
X = RANDOM NUMBER BETWEEN CT AND 52 INCLUSIVE
SWAP DECK[CT] WITH DECK[X]
```

The RNG has a direct impact on whether the algorithm above will successfully produce decks of even distribution as well as whether these decks will be useful for secure electronic card play. To begin with, the RNG itself must produce an even distribution of random numbers. Pseudo-random number generators (PRNG), such as those based on the Lehmer algorithm, have been shown to possess this mathematical property. It is therefore sufficient to use a good PRNG to produce "random" numbers for card shuffling.

In yet another embodiment of the invention, after the winner of a hand has been determined all players who have participated in the pot above the blinds will have their hole cards exposed for a limited period of time before the next hand is dealt. Among other advantage, this unique feature of the invention deters "driving" and collusion between players.

Furthermore, in another embodiment of the invention: after a player is dealt his/her two hole cards face down, the handheld electronic gaming unit of the invention permits the player to view the cards face-up for a limited period of time. This unique feature aids players in preventing their hole cards from being revealed to other players.

In an additional embodiment of the invention, as the blinds are increased, players are "virtually relocated" in such a way as to deter collusion and fraudulent play.

These and other features and advantages will be apparent from the following brief description of the drawings, detailed description, and appended claims and drawings.

BRIEF DESCRIPTION OF THE DRAWINGS

For a more complete understanding, reference is now made to the following description taken in conjunction with the accompanying Drawings in which:

FIG. 9 illustrates a flow diagram of a tournament director activated new player process; and FIG. 10 illustrates a flow diagram of a server executed authorization process.

DETAILED DESCRIPTION

Figure 1:
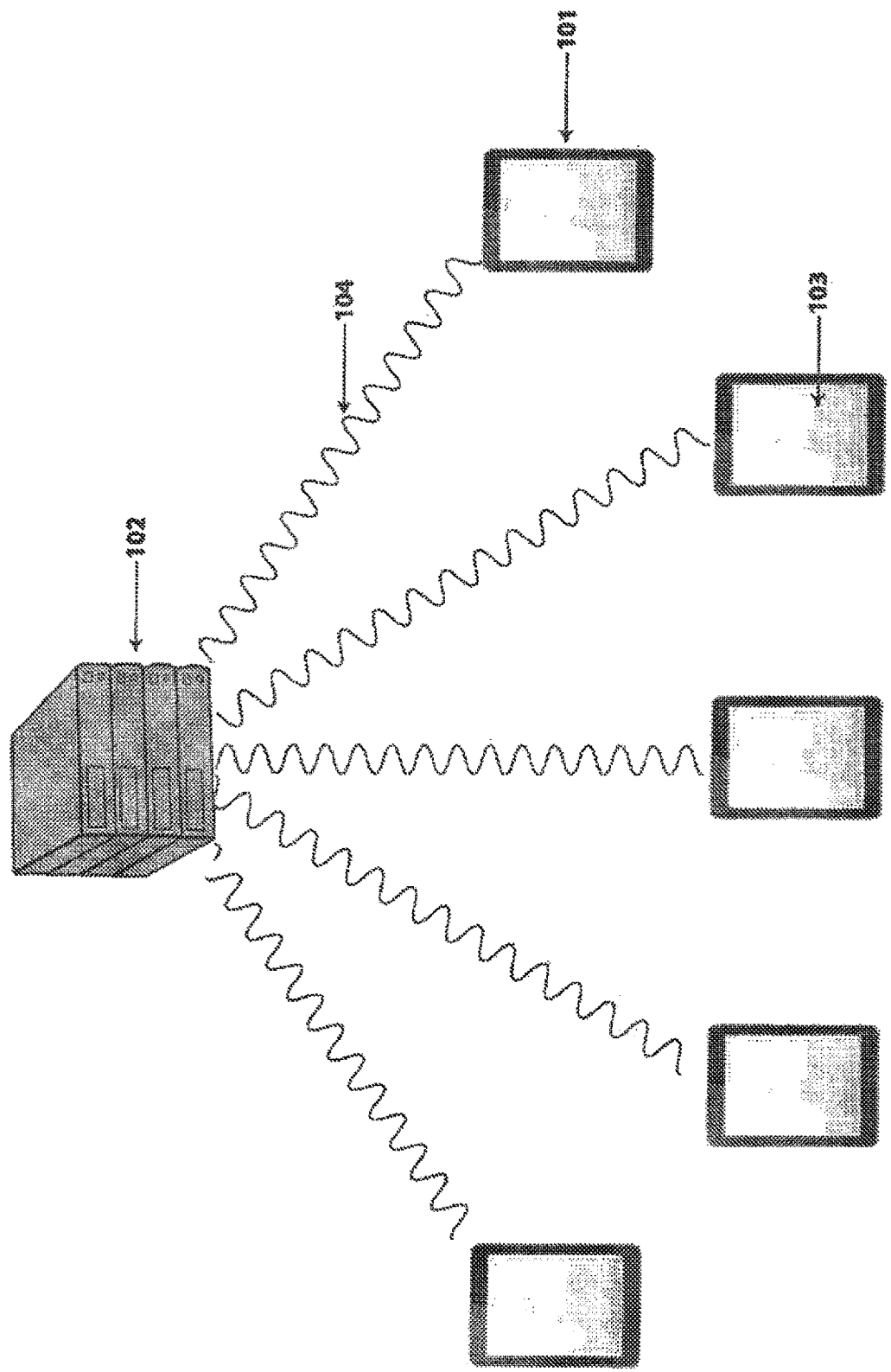
FIG. 1 illustrates a schematic description of a system for conducting a localized, electronic card game tournament of the invention.

Referring now to the drawings, wherein like reference numbers are used herein to designate like elements throughout, the various views and embodiments of a gaming system over WIFI link are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The following description provides details with reference to the accompanying drawings. It should be understood that the invention may be embodied in many different forms and should not be construed as limited to the embodiments set forth herein. The system and method described herein may be implemented on an electronic gaming machine for use in a public venue or a private residence.

FIG. 1 shows a group of handheld electronic game units 101 connected to a remote server 102. The game units pictured are capable of displaying electronic poker or other types of electronic card games. The server is capable of authenticating users and transmitting electronic game events to the game units. The use of the remote server 102 eliminates the need for localized servers in each venue as a single remote server 102 may be able to communicate with game units 101 at a number of venues. Although the remote server is discussed herein as a single server, those of skill in the art will recognize that a remote server may be composed of multiple hardware servers and software configurations.

Each game unit 101 has a number of components. A display 103 is used to show game play and resulting outcomes, and may be in the form of a video display. Touch screen displays are included on most game units and provide a flexible interface for operation, including displaying symbols during play.

All operational functions of the game units 101 are controlled by a controller such as a microprocessor (not shown) housed inside the unit 101. The controller executes instructions that include operation of a random number generator ("RNG") that is well known to those of ordinary skill in the art. Game outcomes are determined based on the results corresponding to the numbers selected by the RNG.

In the system of FIG. 1, game units 101 are connected to a server 102 that is used to interface with game units 101 to perform a number of different functions, depending on how games on game units 101 are configured to operate. Server 102 is in two-way communication with each of the game units 101 in a multi-device system over a network connection 104. Server 102 receives signals from the game units 101 that may indicate any of a number of different types of events occurring on the game units 101. Similarly, the RNG is run securely on the server based system and then delivers the outcomes to be displayed on the game units 101.

It will be understood that the type of network over which data is communicated can be one of several different types of networks. These networks include a Local Area Network (LAN), Wide Area Network (WAN), an Intranet or the Internet. Other proprietary networks could also be used without departing from the principles of the invention.

Figure 2:
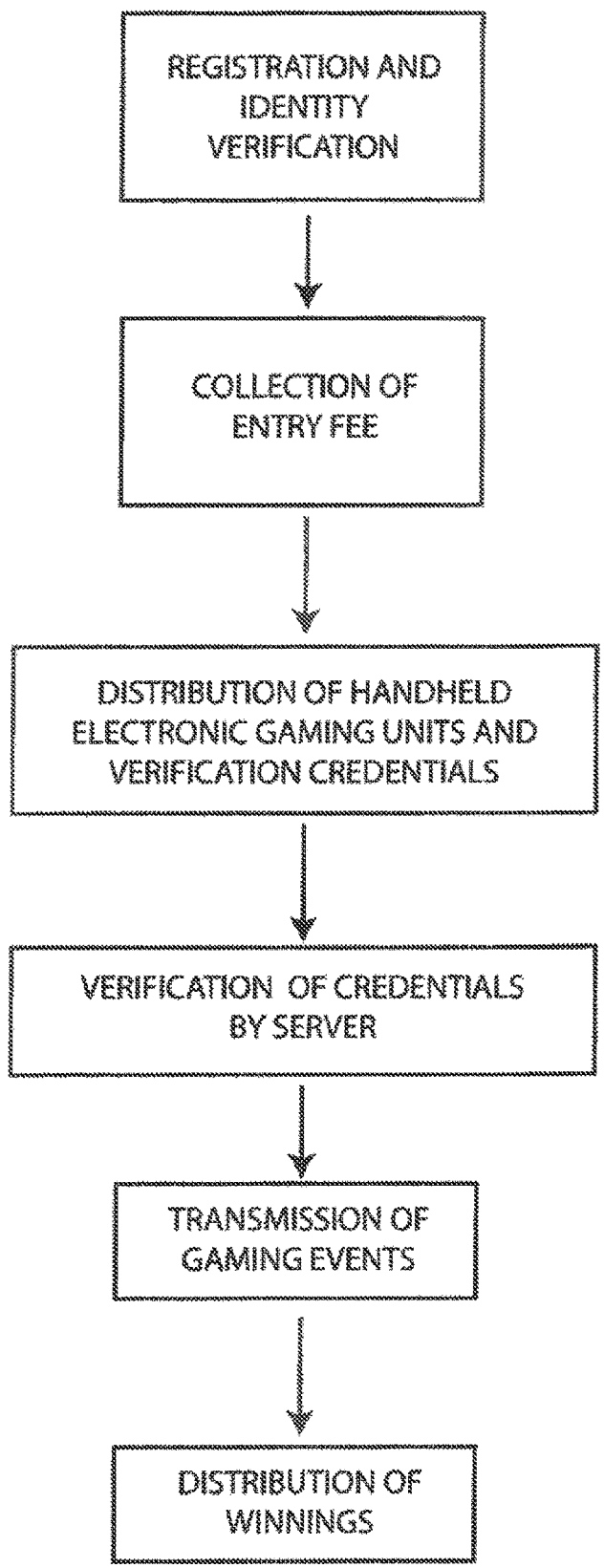
FIG. 2 is a flowchart showing the steps used in conducing conducting a localized, electronic card game tournament of the invention.

FIG. 2 is a flow chart depicting the method of conducting a localized, electronic card game tournament of the invention. In step 1, the tournament players register and their identities are verified. This verification may be made through reviewing a players' governmentally issued identification card or by any other reliable means of verification. In step 2 of this embodiment, players are required to pay a tournament entry fee. This fee is maintained separately from the electronic game system and any fees associated with the use of the electronic game system. In step 3, players are provided with handheld electronic gaming units and player verification credentials. In step 4, players enter their verification credentials into the handheld electronic gaming units and the credentials are transmitted to the server over the network. In step 5, at a specified start time, gaming events are transmitted over the network to the handheld electronic gaming units. In step 6, tournament winnings comprised of the tournament entry fees are distributed to the tournament winners.

Figure 3A:
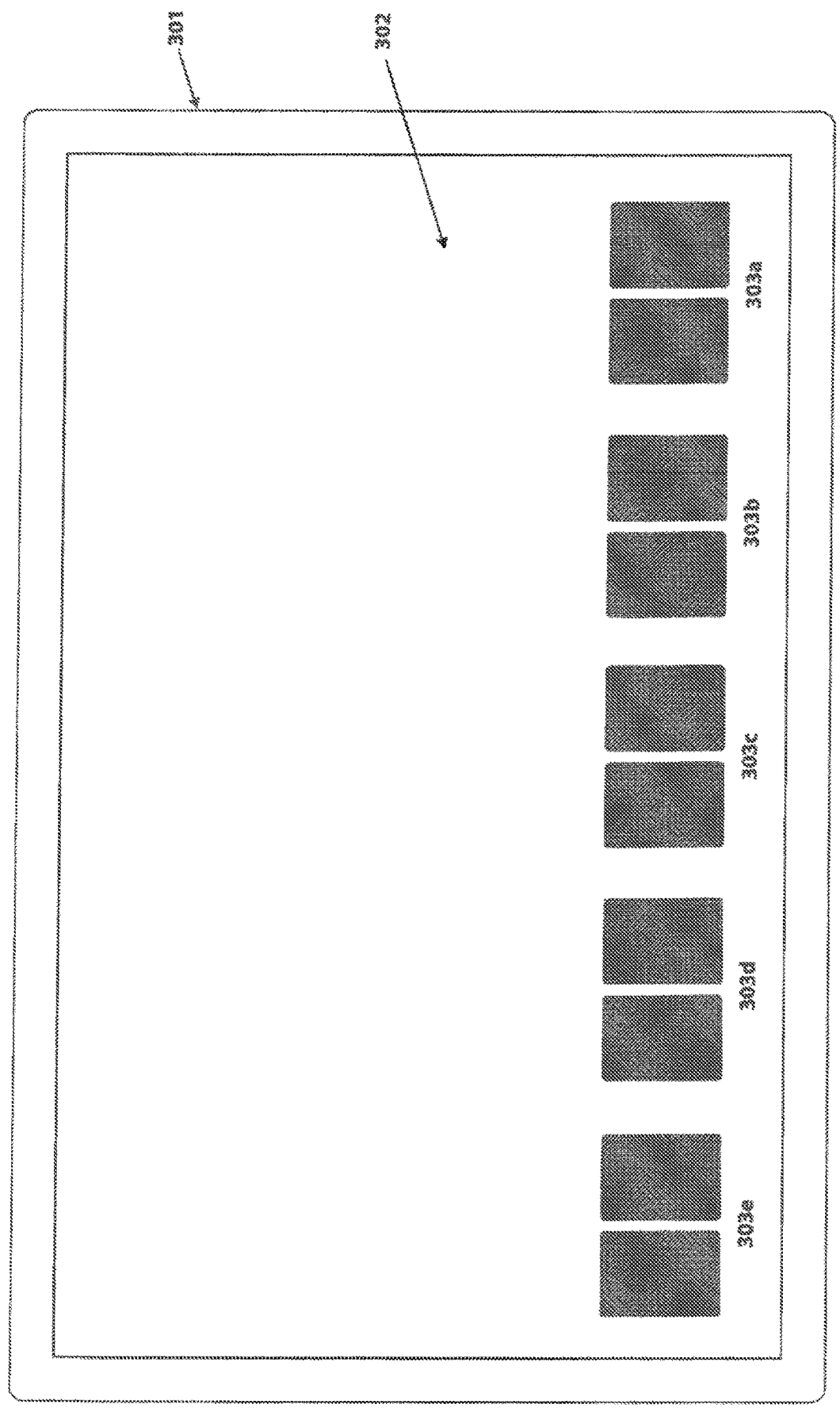
FIG. 3A shows electronic gaming machines for playing a game connected to a network controlled by a server.

FIG. 3A shows a handheld electronic gaming unit 301 for playing a localized, electronic poker tournament of the invention having a display screen 302 for displaying cards or other symbols at positions 303a-e. The display screen 302 may comprise a touchscreen that may be used by a player to provide input to handheld electronic gaming unit 301. Buttons may appear on the screen lined up under card positions 303a-e or otherwise proximate to card positions. A computer processor (not shown) and an internal memory (not shown) that stores an executable game program are among the internal circuit components that allow the handheld electronic gaming unit to operate an electronic poker game or other type of game. As generally discussed above with respect to FIG. 1, the internal components, configurations and operations of a handheld electronic gaming unit are well known to those of ordinary skill in the art.

Figure 3B:
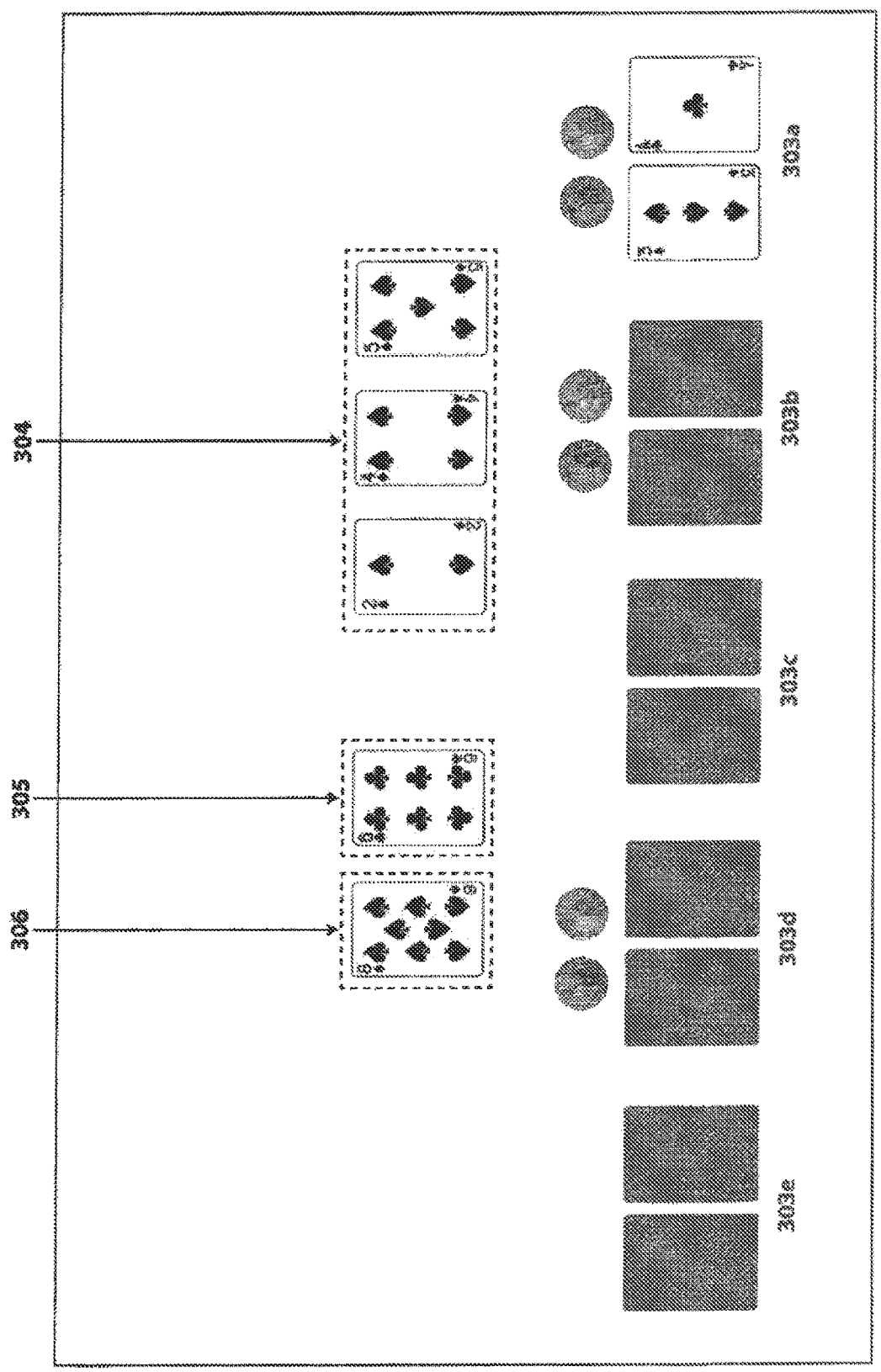
FIG. 3B further shows electronic gaming machines for playing a game connected to a network controlled by a server.

FIG. 3B is a screen shot of display screen 302 of gaming unit 301 after a player has initiated game play. As can be seen in FIG. 3B, the two players to the left of the dealer at positions 303a and 303b have put out blind bets. The screen shot shows the view of the player at location 303a. The player directly to the dealer's left 303a puts out the small blind while the player two to the dealer's left 303b puts out the big blind.

Every player at locations 303a-e is dealt two cards, face down. These are called hole or pocket cards. The cards at location 303a are displayed in the screen shot of this players' view when the "view cards" option has been activated.

The action, or the first move, falls on the player to the left of the big blind 303c. The player at this position can either call the bet, raise it, or fold. Betting continues around the table, clockwise.

After the betting is completed, three cards are dealt face up in the center of the table 304, which is referred to as the board. The first three cards in Texas Hold'em are called the flop. These cards are "community cards" meaning everyone can (and will) use them in combination with their own hole cards to make the best hand.

From the flop on, betting begins with the player to the dealer's left 303a, who can check or bet.

A fourth card is dealt face up onto the board 305. This is called fourth street or the turn card. After this card is dealt, another round of betting occurs.

The final card is dealt face up 306. This card is also called fifth street or the river.

A final round of betting occurs. The remaining players show their cards and the person who can make the best five card hand by combining their pocket cards with the cards on the board wins. In some rare cases in Texas Hold'em, the five cards making up the board will actually be the best hand, in which case everyone left in the hand divides up the pot.

Figure 4:
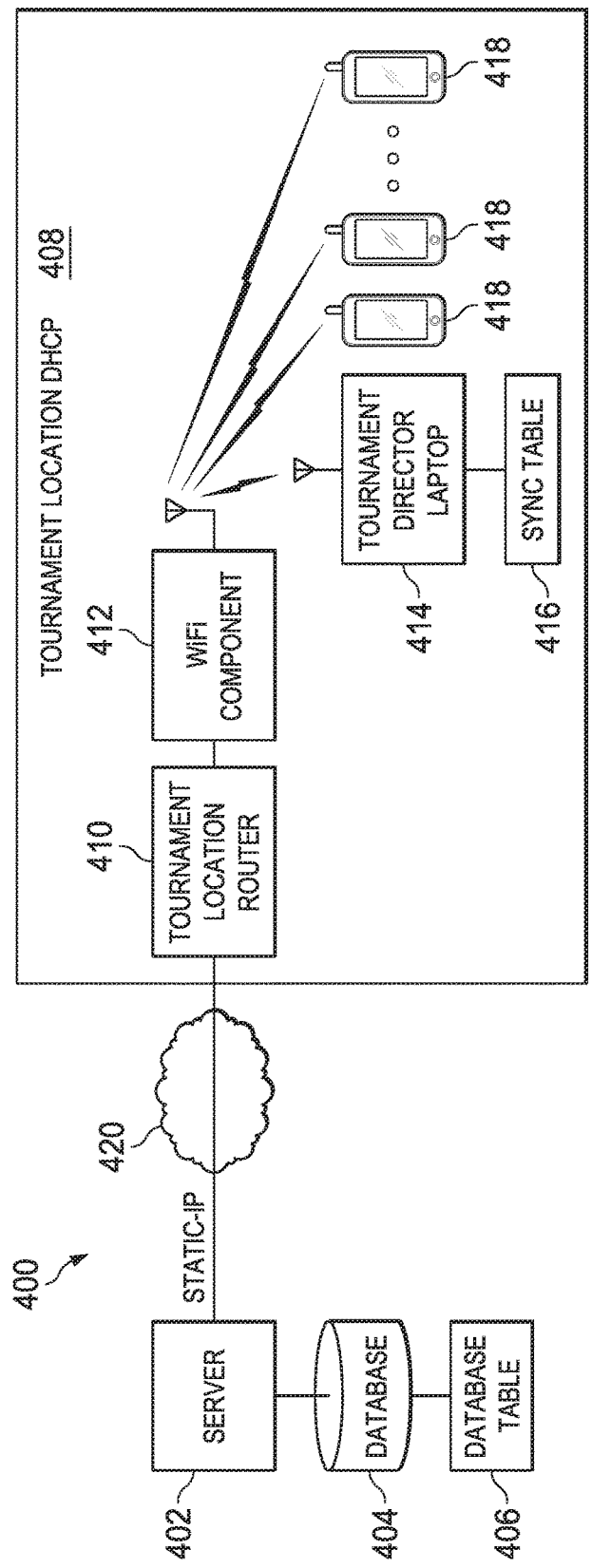
FIG. 4 illustrates a diagrammatic representation of a gaming over WiFi link system.

Referring now to FIG. 4, there is illustrated a diagrammatic representation of a gaming over WiFi link system 400. The gaming over WiFi link system 400 includes a server 402. The server 402 includes a database 404 having a database table 406. The gaming over WiFi link system 400 also includes a tournament location 408, wherein there may be a tournament location router 410 having a WiFi component 412. The tournament location router 410 facilitates communications between the server 402 and devices located at the tournament location 408. A tournament held at the tournament location 408, in some embodiments, may be held by a tournament owner. In some embodiments, the tournament owner would be issued a tournament owner identification number (ID). The tournament owner may hold tournaments at one location, separate tournaments at multiple locations, or a single tournament at multiple locations. A single tournament at multiple locations would enable players from different locations to all participate in the same tournament as the other players at the other locations. A tournament may also have a tournament ID assigned for that tournament.

In one embodiment, the tournament location 408 includes a tournament director laptop 414, which is configured to connect to the WiFi component 412 of the tournament location router 410. The tournament director laptop 414 is controlled by a tournament director, in order to facilitate organization of tournaments and gameplay during those tournaments, at the specific tournament location 408 that a particular tournament director manages. It will be appreciated by one skilled in the art that the tournament director laptop 414 need not be a conventional laptop, but may be any computing device capable of acting as a controller and capable of interfacing with the other devices in the system 400. In some embodiments, the tournament director would be issued a tournament director ID, in order to provide quick reference to a particular tournament director. A tournament director oversees the operation of a tournament at a particular location. In some embodiments, there may also multiple tournament directors if the tournament is a multi-location tournament. In one embodiment, the tournament director laptop 414 includes a sync table 416, which is synced with the database table 406 so that the sync table 416 contains the same information as the database table 406. The tournament location 408 further includes a plurality of mobile devices 418. The plurality of mobile devices 418 are configured to allow for gameplay, and to connect to the WiFi component 412 of the tournament location router 410 in order to send and receive information to and from the server 402. The plurality of mobile devices may have data ports, such as USB ports or other data connections, other than the WiFi antenna and the power connection, that are disabled to prevent copying or loading via ports with flash drives or other physical devices, as well as preventing the players from performing any other activity besides approved tournament play. All communications between devices located within the tournament location 408 and the server 402 travel through an Internet network 420. The URL or IP address of the server 402 is static and hardcoded in a client program running on the tournament director laptop 414 and in the program running on the plurality of mobile devices 418.

The database 404 may store various information concerning players, the tournament owner, the tournament director, the plurality of mobile devices 418, the tournament director laptop 414, and the tournament location router 410. For instance, the database 404 may store the tournament owner ID and tournament director ID in the database table 406. The database 404 may also store in the database table 406 the names, usernames, and passwords of players, player biometrics, and photographs of players to be used with facial recognition technology in order to facilitate player identification and authentication. Information regarding the devices within the tournament location 408 may also be stored in the database table 406, such as a Media Access Control (MAC) address of a Network Interface Controller (NIC), being found in each of the WiFi component 412, the tournament director laptop 414, and the plurality of mobile devices 418. It will be understood by one skilled in the art that a MAC address of a NIC is a unique identifier assigned to the NIC of a device that provides a way for a specific device to be identified according to the MAC address. Storing of the MAC address for each of the devices in tournament location 408 allows for control over which devices are authorized for play, as well as preventing outside devices from interfering with the game, such as an outside device being used for gameplay, rather than an approved device provided by the tournament director. The database 404 may also store a default Service Set Identifier (SSID) of the tournament location router 410. The default SSID would allow for the server to verify that all devices in the tournament location 408 are connected to the WiFi component 412 of the tournament location router 410, in order to disallow game participation by devices that are not connected to the approved WiFi component 412.

Figure 5:
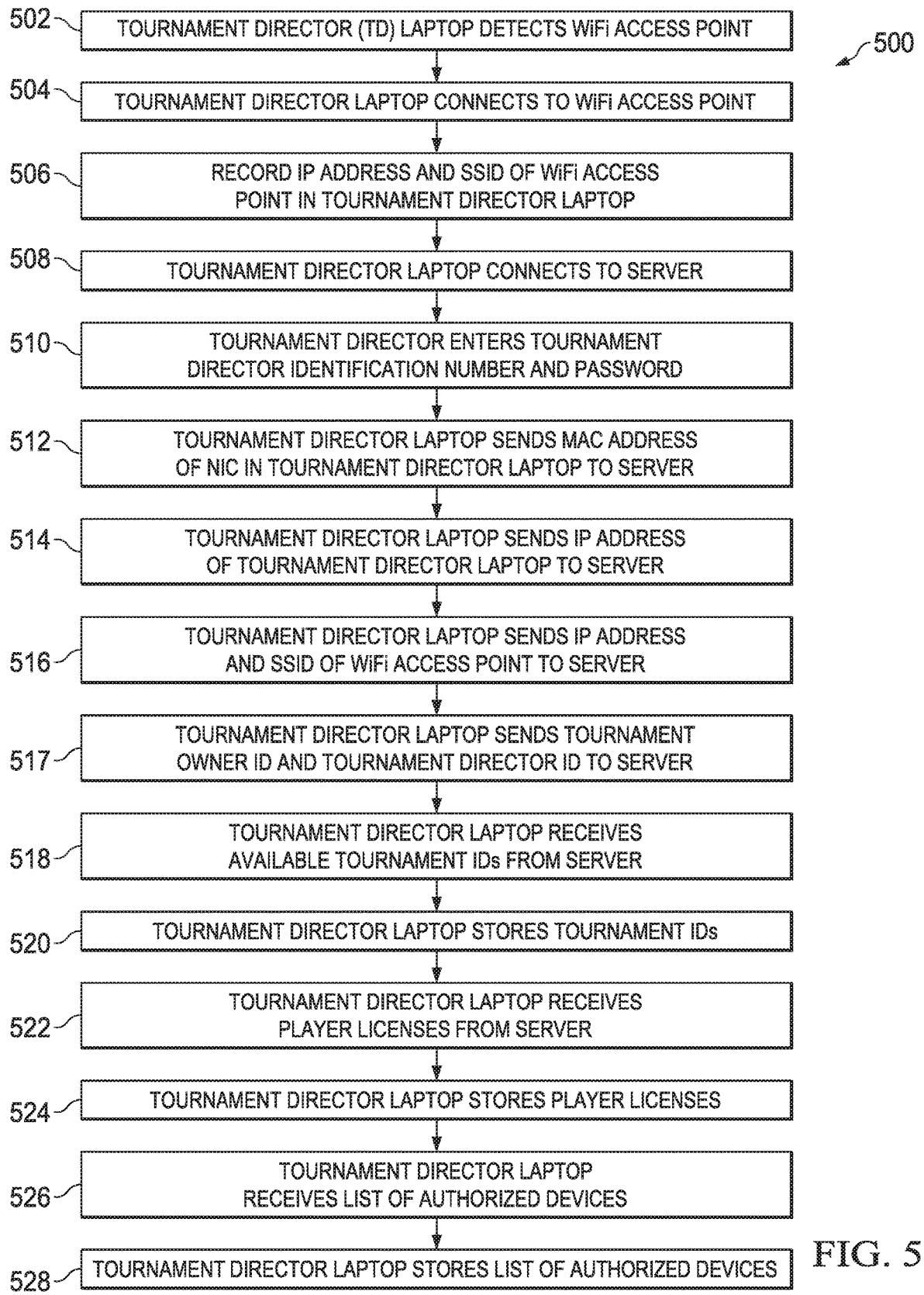
FIG. 5 illustrates a flow diagram of a tournament director laptop and WiFi information setup process.

Referring now to FIG. 5, there is illustrated a flow diagram of a tournament director laptop and WiFi information setup process 500. A step 502, the tournament director laptop 414 detects the WiFi component 412. At step 504, the tournament director laptop 414 connects to the WiFi component 412. At step 506, the tournament director laptop 414 stores the IP address and SSID of the WiFi component 412. At step 508, the tournament director laptop 414 connects to the server 402 via the WiFi component 412 of the tournament location router 410. At step 510, the tournament director enters his associated tournament director ID and any authentication information, such as a password. Once logged in, at step 512, the tournament director laptop 414 sends the MAC address of the NIC contained in the tournament director laptop 414 to the server 402. At step 514 the tournament director laptop 414 sends the IP address of the tournament director laptop 414 to the server 402. At step 516, the tournament director laptop 414 sends the IP address and SSID of the WiFi component 412 to the server 402. At step, 517, the tournament director laptop 414 sends the tournament owner ID and the tournament director ID to the server 402. Once all the information is sent to the server 402, at step 518, the tournament director laptop 414 receives any available tournament IDs from the server 402. Such tournament IDs would be for any tournaments previously registered with the server, and that would be set for a later date. A single tournament ID may provide for a tournament to be played at one location, or at multiple locations. If the tournament is to be a multi-location tournament, the tournament ID would be configured as a multi-location ID to indicate that the particular tournament is a multi-location tournament. In some embodiments, by default, all tournaments would be single location under one tournament organizer. If a tournament organizer wants a tournament spread over multiple locations, that default setting is updated from single location to multi-location, either through a web interface or through a program on the tournament organizer's computer. In some embodiments, it is assumed that each multi-location tournament location will have its own tournament director. When a tournament organizer selects a location and a tournament director for that location, and it is a multi-location tournament, the tournament ID for each location is the same tournament ID.

At step 520, the tournament director laptop 414 stores the received tournament IDs. At step 522, the tournament director laptop 414 receives all available player licenses from the server 402. Player licenses may be purchased by a tournament owner. The player licenses allow players to be authorized for play in a tournament. The player licenses may be specific to a tournament, or may be spread across tournaments. For example, in one embodiment, the tournament owner may wish to hold a tournament, and, thus, purchases 100 licenses for use in that specific tournament. In another embodiment, the tournament owner may purchase 100 licenses before any tournament is scheduled. When the tournament owner later holds a tournament, and 50 players participate, the tournament owner would use up 50 player licenses. Then, at a later tournament, the tournament owner would be able to allow 50 players to play using the remaining 50 player licenses, without needing to purchase any additional licenses for that tournament, unless more than 50 players are scheduled to play.

At step 524, the tournament director laptop 414 stores the received player licenses. At step 526, the tournament director laptop 414 receives a list of authorized mobile devices from the server 402. At step 528, the tournament director laptop 414 stores the list of authorized devices. The information received by the tournament director laptop 414 from the server 402 is saved in the sync table 416. The sync table 416 allows a game to continue to be played in the event that the connection to the server 402 is lost, such as a power outage, Internet outage, or other issues, with the tournament director laptop 414 acting as the server for the mobile devices to interact with while the connection to the server remains lost. The sync table 416 would be updated with game information from the mobile devices until the connection with the server 402 is reestablished, in which case the database table 406 would be updated to reflect the current data in the sync table 416. In other embodiments, the tournament director laptop 414 may serve as the server altogether.

Figure 6:
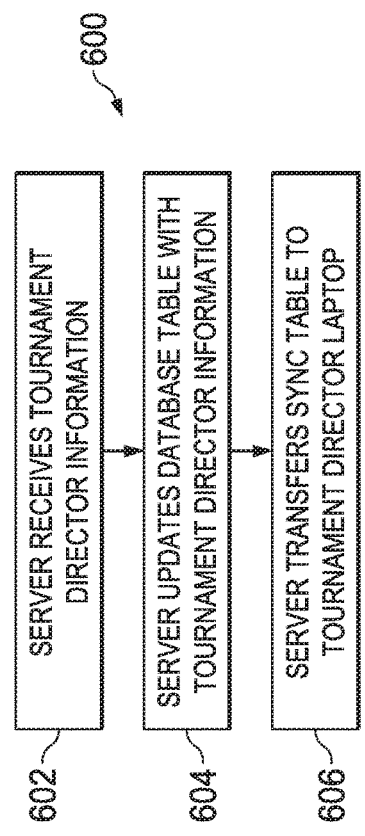
FIG. 6 illustrates a flow diagram of a server database and sync table update process.

Referring now to FIG. 6, there is illustrated a flow diagram of a server database and sync table update process 600. At step 602, the server receives tournament director information from the tournament director laptop 414. At step 604, the server 402 updates the database table 406 with the tournament director information. At step 606, the server 402 transfers the sync table 416 to the tournament direct laptop 414.

Figure 7:
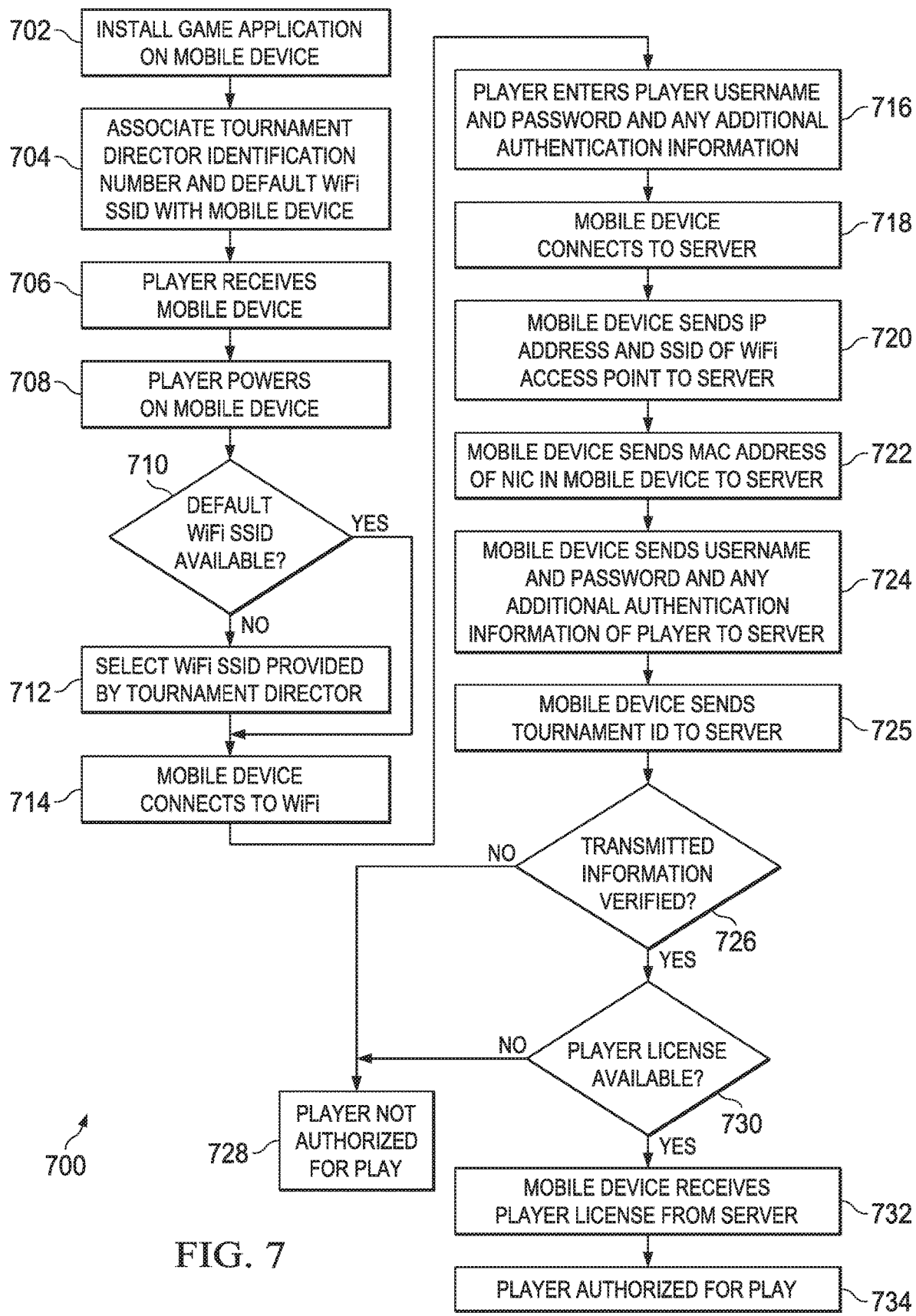
FIG. 7 illustrates a flow diagram of a mobile device and player gameplay authorization process.

Referring now to FIG. 7, there is illustrated a flow diagram of a mobile device and player gameplay authorization process 700. At step 702, a game application is installed on one of the plurality of mobile devices 418 by the tournament director. Each one of the plurality of mobile devices 418 may also have a unique ID associated with that individual mobile device. The game application, or another application installed alongside the game application, may allow for gameplay to be accomplished on the mobile device at various tournaments. The game application may also provide various security measures. For example, the game application or other application installed may provide for the mobile device to be disabled if the mobile device detects that it has been removed from the tournament location 408. Such functionality would prevent players from using the device if they attempt to steal the device or otherwise take it away from the tournament location 408, and deter the players from doing so. At step 704, the tournament director ID and the default SSID of the tournament location router 410 is associated with the mobile device. At step 706, a player receives the mobile device for gameplay. At step 708, the player powers on the mobile device. The process 700 then moves to decision block 710, wherein the mobile device checks whether the default SSID is available for connection. If not, at step 712, an option appears on the mobile device to allow the player to choose a different available SSID provided by the tournament director. If the default SSID is available, or once another available SSID is selected, at step 714, the mobile device connects to the WiFi component 412. At step 716, the player enters his associated username and password, along with any other additional authentication information. Such additional authentication information may include biometrics, such as a thumb print scan, facial recognition via a camera component in the mobile device, or other information.

The process then moves to step 718, where the mobile device connects to the server 402. At step 720, the mobile device sends the IP address and SSID of the WiFi component 412 to the server. At step 722, the mobile device sends the MAC address of the NIC in the mobile device to the server. At step 724, the mobile device sends the username and password, as well as any additional authentication information, to the server. At step 725, the mobile device sends the tournament ID to the server 402. At decision block 726, the server 402 verifies all information sent from the mobile device against the database table 406. If the information sent from the mobile device matches the information in the database table 406, the process moves to decision block 730. If the information does not match, the process moves to step 728, where the player is not authorized for play. At decision block 730, the server determines whether a player license is available. If a player license is available, the process moves to step 732. If a player license is not available the process moves back to step 728, where the player is not authorized for play. At step 732, once it is determined that there exists an available player license, the mobile device receives the player license from the server. The process then flows to step 734, where the player is authorized for play.

Regarding player licenses, in one embodiment, a player license is a data array that consists of a unique license ID, a player ID, the player's password, the tournament ID, the tournament director ID, the tournament organizer ID, the IP address of the mobile device, the MAC address of the NIC in the mobile device, the IP address of the WiFi component 412, the SSID of the WiFi component 412, a date for the tournament, and a start time for the tournament. When a license is assigned to a player, the above information is added to the license by the program on the tournament director laptop 414. A license can only be used for one tournament, and afterwards will be referenced as historical data by any entity needing information about a tournament.

Figure 8:
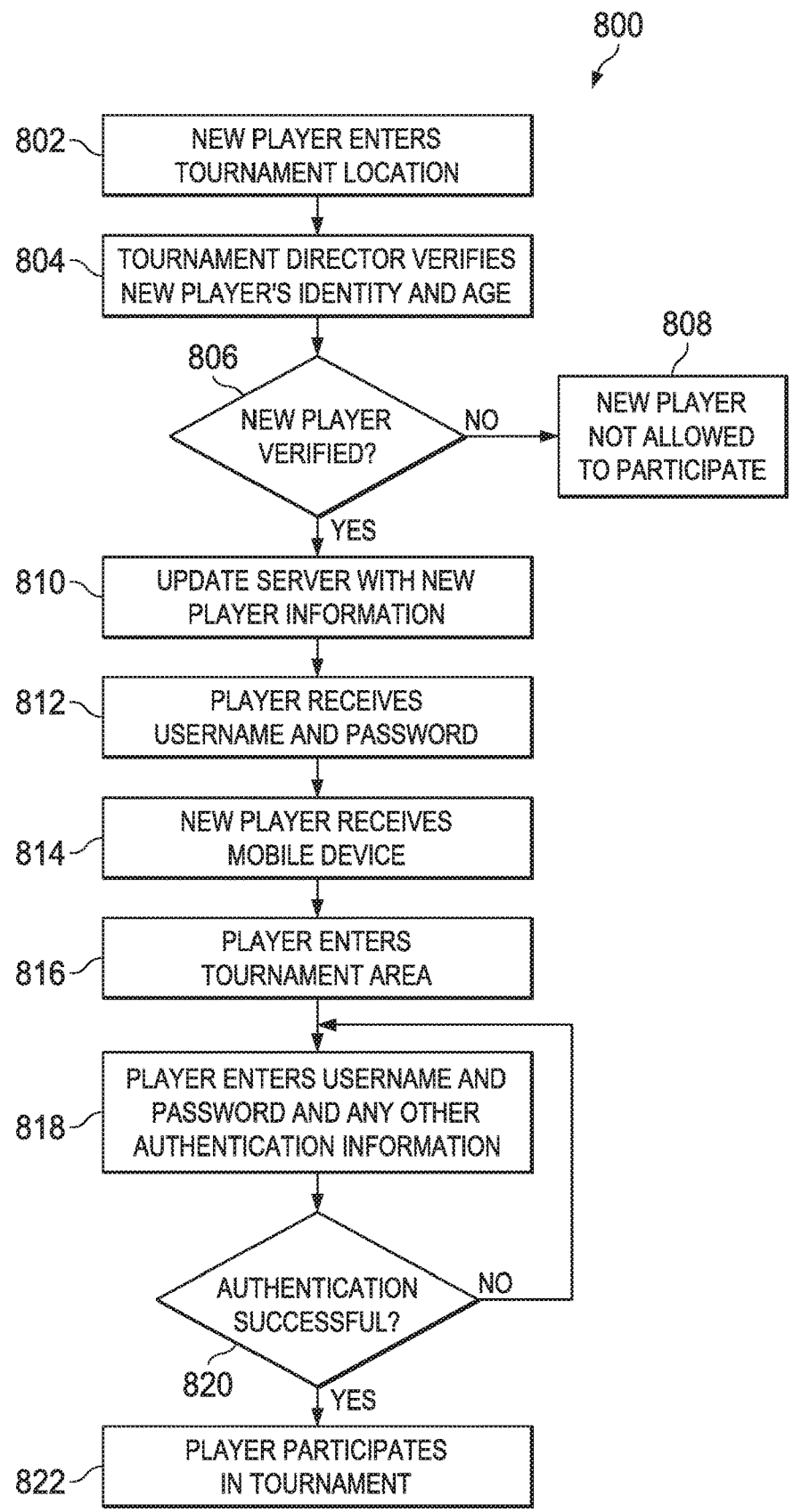
FIG. 8 illustrates a flow diagram of a new player verification and authorization process.

Referring now to FIG. 8, there is illustrated a flow diagram of a new player verification and authorization process 800. At step 802, the new player enters the tournament location 408. At step 804, the tournament director verifies the new player's identity and age. Typically, this would involve inspecting a valid photo identification card belonging to the new player, such as a driver's license. Such an identity and age check is extremely important, as the tournament location 408 must ensure that players are of the legal age to play in the tournament based on the laws applicable to the tournament location 408. At decision block 806, it is determined if the new player is verified based on the new player's identity and age. If the new player is not verified, at step 808 the new player is not allowed to participate in the tournament. If the new player is verified, the process moves to step 810. At step 810, the server 402 is updated with the player's personal information. At step 812, the new player receives a username and password. At step 814, the new player receives a mobile device. At step 816, the new player enters the tournament area with the mobile device in the new player's possession. At step 818, the new player enters the received username and password, as well as any other required authentication information, into the mobile device. At decision block 820, it is determined whether the new player authentication was successful. If not, the process moves back to step 818 to allow the user to reenter the authentication information. If authentication is successful, the process moves to step 822. At step 822, the new player participates in the tournament.

If, during the tournament, a mobile device runs out of battery power, disconnects from the network, or otherwise stops participating in the tournament, there is a certain amount of time or a certain amount of gameplay allotted for such an event to give the player time to reconnect, be issued a new mobile device, etc. For example, in some embodiments, the default option for such an occurrence may allow the player 5 hands or rounds to be played before the player is permanently booted or expelled from that particular tournament. Such a system would prevent players from dropping out of the game and not participating, while waiting for an advantageous time to reenter the game. Such tactics might be unfair to other players. Therefore, parameters such as that described in the above example are necessary to keep an even playing field between players, while also allowing for technical difficulties to be addressed.

Referring now to FIG. 9, there is illustrated a flow diagram of a tournament director activated new player process 900. At step 902, the tournament director verifies the identity and age of the new player. At decision block 904, it is determines whether the new player is accepted based on the new player's identity and age. If the new player is not accepted, the process moves to step 906, where the new player is not allowed to play in the tournament. If the new player is accepted, the process moves to step 908. At step 908, the tournament director selects a mobile device to be used by the new player. At step 910, the tournament director records the identification number of the selected mobile device. At step 912, the tournament director sends the identification number of the selected mobile device to the server 402. At step 914, the server 402 associates the identification number of the mobile device with a username and password in the database 404. At step 916, the server 402 issues a player license to the tournament director. At step 918, the tournament director issues the selected mobile device to the new player.

Referring now to FIG. 10, there is illustrated a flow diagram of a server executed authorization process 1000. At step 1002, the server 402 received a request for authorization from a mobile device. At step 1004, the server 402 receives a player username and password, as well as any additional player authentication information. At step 1006, the server 402 receives the MAC address of the NIC in the mobile device. At step 1008, the server 402 receives the MAC address of the NIC in the WiFi component 412, as well as the SSID of the WiFi component 412. At decision block 1010, it is determined if the mobile device is authorized based on the information received by the server 402 in steps 1004, 1006, and 1008. If the mobile device is not authorized, the server sends an error message to the mobile device at step 1012. If the mobile device is authorized, the process moves to step 1014. At step 1014, the mobile device is ready for tournament play.

In some embodiments, before and during tournament play the tournament director laptop 414 and the plurality of mobile devices 418 are authenticated with each transaction performed. Such transactions may be the tournament or device activation and setup processes described hereinabove, or messages sent during tournament play. Each transaction wherein the tournament director laptop 414 needs to be authenticated involves the tournament director laptop 414 sending to the server the tournament ID, the tournament organizer ID, the tournament director ID, the MAC address of the NIC in the tournament director laptop 414, the IP address of the tournament director laptop 414, the IP address of the WiFi component 412, and the SSID of the WiFi component 412. For each transaction wherein authentication of one of the plurality of mobile devices 418 is required, the mobile device sends to the server the player ID, player password, and the player license associated with the player using the mobile device, as well as the tournament ID, the MAC address of the NIC in the mobile device, the IP address of the mobile device, the IP address of the WiFi component 412, and the SSID of the WiFi component 412. If the above data is validated against the database 404, the particular transaction is allowed. If the tournament director laptop 414 or mobile device data changes, that device is blocked. Similarly, if the MAC address of the NIC in the mobile device or the IP address of the mobile device is not in the database 404, that mobile device is not allowed to play in the tournament. For this reason, all mobile device IP addresses and MAC addresses associated with a player ID and a player license must remain consistent throughout the tournament. If the IP address and MAC address associated with a player ID and a player license changes due to the player having to change devices in case of device malfunction, or other approved reasons, the player will be suspended from play until the tournament director reactivates the player. This prevents multiple players from using one player ID and license. It also prevents one player from playing on multiple mobile devices at once.

Similarly, if a tournament director changes laptops, or for some other reason obtains a different IP address and MAC address, the tournament director is allowed to proceed unless the server detects the original laptop is still being used. In that case, the server will suspend both laptops and require re-authentication of the tournament director's ID and password. The first device that responds with the tournament director ID and password will be activated again, and the other laptop will remain in suspension. This prevents multiple people from trying to act as tournament director. It also prevents other people with a laptop and software from attempting to pose as the tournament director. If there is an issue with the WiFi component 412 at the tournament location 408, the tournament director is allowed to specify a different WiFi SSID, and the server will then detect and accept that change. The players would then need to switch to the new WiFi SSID.

It is to be understood that the above descriptions and drawings are only for illustrating representative variations of the present invention and are not intended to limit the scope thereof. Any variation and derivation from the above description and drawings are included in the scope of the present invention.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for gaming over a WiFi link, comprising: receiving, at a server having a database and being disposed on a network, a request from a mobile device to be authorized for play in a tournament; receiving, at the server and from the mobile device, authorization information; determining by the server whether the mobile device is authorized for play in the tournament by comparing the authorization information against information contained in the database; authorizing, if the authorization information matches the information contained in the database, the mobile device for play in the tournament; and sending from the server a player license to the mobile device, the player license enabling the mobile device to be used in the tournament; and the player license is a data array that consists of a unique license ID, a player ID, a player password, a tournament ID, a tournament director ID, a tournament organizer ID, an IP address of the mobile device, a MAC address of a NIC in the mobile device, an IP address of a WiFi component, an SSID of the WiFi component, a date for the tournament, and a start time for the tournament.

2. The method of claim 1, wherein the authorization information includes player identification information, a MAC address of a NIC in the mobile device, a MAC address of a NIC in a WiFi link, and a SSID of the WiFi link.

3. The method of claim 2, wherein the player identification information includes biometric information.

4. The method of claim 2, wherein the player identification information includes facial recognition information.

5. A system for gaming over a WiFi link, comprising: a server, disposed on a location on a network, having a database configured thereon, the database including authorization information and the server further configured for comparing received authorization information against the authorization information in the database includes a player license is a data array that consists of a unique license ID, a player ID, a player password, a tournament ID, a tournament director ID, a tournament organizer ID, an IP address of the mobile device, a MAC address of a NIC in the mobile device, an IP address of a WiFi component, an SSID of the WiFi component, a date for the tournament, and a start time for the tournament in the database; the WiFi link configured to provide a wireless connection to the network; a plurality of mobile devices configured to connect to the network via the WiFi link and configured to send the received authorization information to the server; and a controller device, configured to connect to the network via the WiFi link, for syncing gameplay between the plurality of mobile devices, the server, and the controller device in a tournament and configured to send the received authorization information to the server.

6. The method of claim 5, wherein the received authorization information includes an IP address, the SSID of the WiFi link, a MAC address of a NIC of the mobile device, and player identification information.

7. The method of claim 6, wherein the player identification information includes biometric information.

8. The method of claim 6, wherein the player identification information includes facial recognition information.

* * * * *